United States Patent Office 3,221,011
Patented Nov. 30, 1965

3,221,011
DIBENZAZEPINE DERIVATIVES
Jany Renz, Jean-Pierre Bourquin, and Hans Winkler, Basel, Conrad Bruschweiler, Birsfelden, Leo Ruesch, Basel, and Gustav Schwarb, Neuallschwil, Switzerland, assignors to Sandoz Ltd. (also known as Sandoz A.G.), Basel, Switzerland
No Drawing. Filed Dec. 16, 1963, Ser. No. 330,620
Claims priority, application Switzerland, Dec. 17, 1962, 14,805/62; Oct. 24, 1963, 13,052/63
3 Claims. (Cl. 260—239)

The present invention relates to new heterocyclic compounds and to a process for the production thereof.

The present invention provides dibenzazepine derivatives of Formula I,

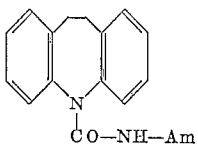

in which Am signifies an amino, monoalkyl-or dialkylamino radical containing from 1 to 4 carbon atoms inclusive in the alkyl radical of each of them.

The present invention also provides a first process for the production of the compounds I above which comprises reaction a 10,11-dihydro-5H-dibenz[b,f]azepine-5-carboxylic acid halide of Formula II,

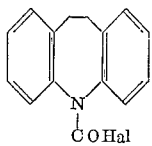

in which Hal signifies a chlorine or bromine atom, with a hydrazine derivative of Formula III, $$H_2N—Am \quad (III)$$

in which Am has the above significance.

The symbol Am in Formulae I and III may, for example, signify the radical —NH₂ a monomethyl, monoethyl, mono-n-propyl, mono-isopropyl, mono-n-butyl, mono-isobutyl or mono-tert.-butylamino radical, a dimethyl, diethyl, di-n-propyl, diisopropyl, di-n-butyl, diisobutylamino radical, a methylethylamino, methyl-n-propylamino, methylisopropylamino or ethylisopropylamino radical.

The process of the invention may, for example, be effected in such a way that a 10,11-dihydro-5H-dibenz[b,f] azepine-5-carboxylic acid halide of formula II in a suitable solvent, e.g. methanol, ethanol or isopropanol, is reacted with a hydrazine derivative of Formula III at room temperature or higher. Advantageously, an excess of hydrazine derivative is used or the condensation effected in the presence of another base in order to bind the halogen hydracid liberated during the reaction. After completion of the reaction, the solvent is removed by evaporation, the residue dissolved in a water immiscible solvent, e.g., chloroform or benzene, the solution washed first with a dilute aqueous caustic alkali solution and then with water, the solvent removed by evaporation and residue crystallized from a suitable solvent.

The present invention further provides a second process for the production of the compounds I above and their acid addition salts, which comprises reacting a urethane of Formula IV, new compounds,

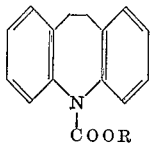

in which R signifies an alkyl radical containing from 1 to 4 carbon atoms inclusive, with a hydrazine derivative of Formula III above.

A urethane of formula IV may, for example, be obtained by reacting 10,11-dihydro-5H-dibenz[b,f]azepine with a chlorocarbonic acid ester of Formula V,

in which R has the above significance.

The present invention also includes the compounds IV above.

Conversion of a urethane IV to a compound I may be effected under reaction conditions which are the same or similar to those used for the reaction of a carboxylic acid halide of Formula II with a hydrazine derivative of Formula III.

The 10,11-dihydro-5H-dibenz[b,f]azepine-5-carboxylic acid hydrazides of the invention are slightly basic; at room temperature they are of an oily or crystalline nature. They show a remarkably strong anticonvulsive and furthermore a tuberculostatic activity and can therefore be used in the treatment of epilepsy and tuberculosis.

The compounds of the invention may be employed as pharmaceuticals as such, or in the form of appropriate medicinal preparations for administration, e.g. enterally or parentally. In order to produce such medicinal preparations, the compounds of the invention are worked up with inorganic or organic adjuvants which are physiologically acceptable and inert. Examples of such adjuvants or carriers for various medicinal preparations are as follows:

(1) Tablets and dragees: lactose, starch, talc and stearic acid.
(2) Syrups: solutions of cane sugar, invert sugar and glucose.
(3) Injectable solutions: water, physiologically acceptable alcohols, glycerine and physiologically acceptable vegetable fats.
(4) Suppositories: physiologically acceptable, natural or hardened oils and waxes.
(5) Ointments, suspensions and emulsions: inorganic and organic, lipophilic or hydrophilic compounds, paraffin, alginates, cellulose derivatives, polyoxyethylene derivatives, bentonite and petroleum jelly.

The preparation may contain suitable preserving, stabilizing or wetting agents, solubilizers, sweetening and colouring substances or flavourings, with the proviso that they must be physiologically acceptable.

The present invention thus also provides pharmaceutical compositions containing, in addition to a physiologically acceptable inert carrier, a compound I above.

In the following non-limitative examples, all temperatures are indicated in degrees centigrade. The melting points are corrected.

*Example 1.—10,11-dihydro-5H-dibenz[b,f]azepine-5-carboxylic acid hydrazide*

A solution of 5.57 g. of phosgene in 50 cc. of toluene is added to a solution of 5.15 g. of 10,11-dihydro-5H-dibenz[b,f]azepine in 50 cc. of benzene, the mixture heated slowly in a water bath and then boiled for 3 hours at reflux. After concentrating in a vacuum, the evaporation residue is dissolved in 25 cc. of ethanol and added to a solution of 4.23 g. of hydrazine hydrate in 70 cc. of ethanol at room temperature and whilst stirring. After heating for 1 hour in a water bath at 90°, the reaction mixture is reduced in volume in a vacuum, the residue taken up in 75 cc. of chloroform and washed with 50 cc. of water. After reducing the volume of the chloroform solution by evaporation, the residue is crystallized twice from ethyl acetate. The resulting analytically pure 10,11-dihydro-5H-dibenz[b,f]azepine - 5 - carboxylic acid hydrazide has a melting point of 171–173°.

*Example 2.—10,11-dihydro-5H-dibenz[b,f]azepine-5-carboxylic acid 2',2'-dimethyl hydrazide*

A solution of 5.38 g. of 1,1-dimethyl hydrazine in 10 cc. of chloroform is added dropwise to a solution of 7.7 g. of 10,11-dihydro-5H-dibenz[b,f]azepine-5-carboxylic acid chloride in 25 cc. of chloroform for ½ hour, at room temperature and whilst stirring, whereby the temperature rises up to 45°. After stirring for a further two hours the chloroform solution is first shaken out with 50 cc. of 2 N sodium hydroxide solution, then washed with 75 cc. of water, dried over potash, filtered and evaporated in a partial vacuum. For purification the residue remaining after evaporation is dissolved in 50 cc. of benzene and absorbed on a column of 220 g. of aluminium oxide. The first 500 cc. of benzene eluate are discarded and the following eluates of 260 cc. of benzene and 400 cc. of benzene +1% methanol are concentrated together.

After crystallizing the evaporation residue twice, each time from 15 cc. of ethyl acetate, the pure 10,11-dihydro-5H-dibenz[b,f]azepine-5-carboxylic acid 2',2'-dimethyl hydrazide is obtained with a melting point of 134°–136° C.

What is claimed is:

1. A compound of the formula:

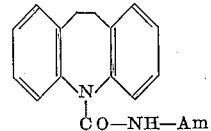

wherein Am is a member of the group consisting of amino, mono-lower alkyl amino and di-lower alkyl amino.

2. 10,11-dihydro - 5H - dibenz[b,f]azepine-5-carbonic acid hydrazide.

3. 10,11-dihydro - 5H - dibenz[b,f]azepine-5-carbonic acid-2',2'-dimethyl-hydrazide.

References Cited by the Examiner

UNITED STATES PATENTS

| | | | |
|---|---|---|---|
| 2,762,796 | 9/1956 | Morel et al | 260—239 |
| 2,811,520 | 10/1957 | Gailliot et al | 260—239 |
| 2,948,718 | 8/1960 | Schindler | 260—239 |
| 2,948,732 | 8/1960 | Schindler et al | 260—294.3 |
| 3,013,943 | 12/1961 | Berger | 167—65 |
| 3,098,791 | 7/1963 | Fancher | 167—65 |

NICHOLAS S. RIZZO, *Primary Examiner.*

HENRY R. JILES, *Examiner.*